United States Patent
Leung et al.

(10) Patent No.: US 10,690,171 B2
(45) Date of Patent: Jun. 23, 2020

(54) NUT ELEMENT INSTALLATION TOOL AND METHOD FOR INSTALLING A NUT PLATE ASSEMBLY

(71) Applicant: THE BOEING COMPANY, Chicago, IL (US)

(72) Inventors: Kwok-Wood Leung, Hoppers Crossing (AU); Adam James Begg, Southbank (AU); Timothy Michael Trewern, Mitcham (AU)

(73) Assignee: THE BOEING COMPANY, Chicago, IL (US)

( * ) Notice: Subject to any disclaimer, the term of this patent is extended or adjusted under 35 U.S.C. 154(b) by 266 days.

(21) Appl. No.: 15/601,375

(22) Filed: May 22, 2017

(65) Prior Publication Data
US 2018/0335071 A1    Nov. 22, 2018

(51) Int. Cl.
*F16B 37/04*   (2006.01)
*B64C 9/00*    (2006.01)
*F16B 2/24*    (2006.01)

(52) U.S. Cl.
CPC .............. *F16B 37/044* (2013.01); *B64C 9/00* (2013.01); *F16B 2/248* (2013.01)

(58) Field of Classification Search
CPC .......... B64C 9/00; F16B 37/044; F16B 2/248; B23P 19/102

USPC ................. 29/238, 243.5, 244, 255
See application file for complete search history.

(56) References Cited

U.S. PATENT DOCUMENTS

| | | | |
|---|---|---|---|
| 5,794,321 A * | 8/1998 | Jereb | B25B 27/26 269/249 |
| 7,237,314 B2 | 7/2007 | Toosky | |
| 7,823,262 B2 | 11/2010 | Toosky et al. | |
| 2007/0224016 A1 | 9/2007 | Toosky et al. | |

* cited by examiner

*Primary Examiner* — Orlando E Aviles
*Assistant Examiner* — Thomas Raymond Rodgers
(74) *Attorney, Agent, or Firm* — The Small Patent Law Group LLC; Jay J. Hoette (57) ABSTRACT

A nut element installation tool includes a holder for a nut element and retaining clip and a shaft coupled to the holder. The holder includes an upper plate, a lower plate and a shuttle movable between an extended position and a released position. The shuttle has a pocket configured to receive the nut element and the retaining clip. The retaining clip is compressed and held in a compressed state in the pocket until the shuttle is moved to the released position when the retaining clip is free to move to an expanded state in a nut plate basket to retain the nut element in the nut plate basket. The shaft is releasably coupled to the shuttle and holds the shuttle in the extended position.

20 Claims, 5 Drawing Sheets

NUT ELEMENT INSTALLATION TOOL AND METHOD FOR INSTALLING A NUT PLATE ASSEMBLY

BACKGROUND

The subject matter herein relates generally to a nut element installation tool and method for installing a nut plate assembly.

Nut plate assemblies are used on structures to threadably attach components to the structures, such as removable fasteners. The nut plate assemblies use nut plates as retaining systems for nut elements. The nut plates are installed in a structure when the structure is open and the components may be attached after the structure is closed when access to the nut is limited. One particular application for such nut plate assemblies is on aircraft structures, such as flaps for aircraft. For example, in a ground support equipment application, a removable fastener is attached to the aircraft structure for lifting equipment to remove the aircraft structure from a crate and attach the structure to the aircraft. The removable fastener may then be removed from the nut element.

However, nut plate assemblies are not without disadvantages. For instance, the nut element may fall out of the nut plate or fail, such as by striping the threads on the nut element, requiring replacement of the nut element in the nut plate. However, access to the nut plate may be restricted. For example, the structure may be a closed structure only having inspection or vent holes to access the interior of the structure. It is difficult or impossible for an installer to reach the interior of the nut plate to install a new nut element by hand. Replacement of such nut elements typically involves removing large portions of the structure to access the nut plate, which is time consuming, requires much rework, and may damage portions of the structure.

A need remains for a nut element installation tool and method for a nut plate assembly.

BRIEF DESCRIPTION

In one example, a nut element installation tool is provided for installing a nut element in a nut plate basket using a retaining clip in an interior of a closed structure. The nut element installation tool includes a holder for the nut element and the retaining clip and a shaft coupled to the holder. The holder includes an upper plate, a lower plate and a shuttle movable between the upper plate and the lower plate between an extended position and a released position. The upper plate has an upper plate bore extending between a first surface and a second surface of the upper plate. The lower plate has a lower plate bore extending between a first surface and a second surface of the lower plate. The shuttle has a shuttle bore extending between a first surface and a second surface of the shuttle. The shuttle has a pocket at the first surface configured to receive the nut element and the retaining clip. The retaining clip is configured to be compressed and held in a compressed state in the pocket until the shuttle is moved to the released position when the retaining clip is free to move to an expanded state in the nut plate basket to retain the nut element in the nut plate basket. The shaft passes through the lower plate bore into the shuttle bore to releasably couple to the shuttle. The shaft is configured to hold the shuttle in the extended position.

In another example, a nut plate assembly is provided including a nut element and a retaining clip configured to be releasably coupled to a nut plate basket mounted to a closed structure at a mounting location. The nut element and the retaining clip are coupled to an interior of the nut plate basket facing an interior of the closed structure. The just plate assembly includes a nut element installation tool for installing the nut element and the retaining clip on the nut plate basket. The nut element installation tool includes a holder and a shaft releasably coupled to the holder. The holder holds the nut element and the retaining clip and is positionable inside the interior of the closed structure to interface with the interior of the nut plate basket. The shaft is configured to extend from the holder to an exterior of the closed structure for removal of the shaft from the holder. The holder has an upper plate, a lower plate fixed relative to the upper plate and a shuttle movably coupled between the upper plate and the lower plate. The shuttle is movable between an extended position and a released position. The shaft holds the shuttle in the extended position and the shuttle is movable to the released position after the shaft is released from the holder. The shuttle has a pocket configured to hold the nut element and the retaining clip in the extended position. The nut element and the retaining clip are released into the nut plate basket in the released position.

In a further example, a method of installing a nut element in a nut plate basket using a retaining clip in an interior of a closed structure is provided including loading a retaining clip and a nut element in a holder including an upper plate, a lower plate and a shuttle movable between the upper plate and the lower plate between an extended position and a released position, wherein the retaining clip is held in a compressed state in a pocket of the shuttle below the lower plate. The method includes threadably coupling a shaft to the shuttle of the holder that passes through the nut element. The method includes positioning the holder in the closed structure at an interior surface of the nut plate basket such that the shaft protrudes through the nut plate basket beyond an exterior of the nut plate basket such that the shaft is accessible from an exterior of the closed structure. The method includes removing the shaft from the shuttle to release the shuttle and moving the shuttle relative to the lower plate from the extended position to the released position to release the nut element and the retaining clip from the pocket to allow the retaining clip to expand and couple to the nut plate basket to secure the nut element in the nut plate basket. The method includes removing the holder from the closed structure.

DETAILED DESCRIPTION

Exemplary embodiments of the subject matter herein relate to nut plate assemblies and replacing nut elements of the nut plate assemblies. Exemplary embodiments of the subject matter herein include a nut element installation tool for replacing a nut element in a nut plate, such as a BACN11G nut plate or other type of nut plate. The nut element installation tool allows replacement of the nut element in situations with limited access to the nut plate. The nut element installation tool allows the nut element to be replaced without the need for significant rework or alteration of the structure including the nut plate. Exemplary embodiments of the subject matter herein allow the replacement nut element and retention clip to be loaded into the nut element installation tool, allow maneuvering into position relative to the nut plate, allow releasing of the nut element and retention clip from the nut element installation tool and allow retraction of the nut element installation tool from the structure. Exemplary embodiments of the subject matter herein allow maneuvering of the nut element installation tool through the interior of the closed structure holding the nut plate in areas with limited or no access by the installer, such as in areas beyond the reach of the installer or in areas that are too tight for the installer to manipulate the nut element installation tool by hand. Exemplary embodiments of the subject matter herein may be used to replace a nut element in a nut plate that receives a removable fastener, such as on ground support equipment (GSE) on aircraft structures such as for lifting equipment to be temporarily attached to the structure with removable fasteners so that it can be removed from a crate and then attached to an aircraft; however, the subject matter herein may be applicable to other applications as well.

Figure 1:
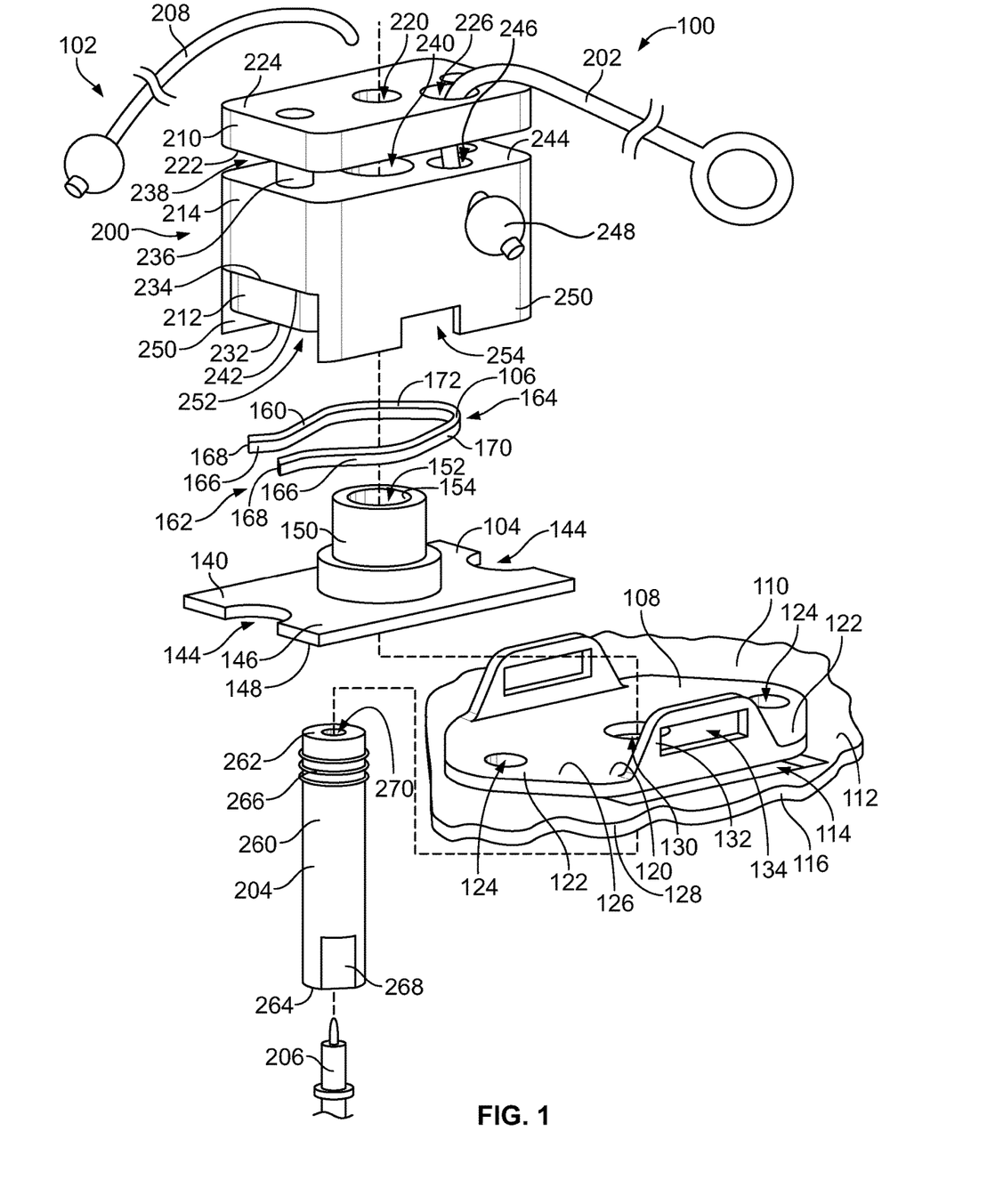
FIG. 1 is an exploded view of a nut plate assembly in accordance with an exemplary embodiment.

FIG. 1 is an exploded view of a nut plate assembly 100 in accordance with an exemplary embodiment. The nut plate assembly 100 includes a nut element installation tool 102 for installing a nut element 104 and a retaining clip 106 in a nut plate basket 108. The nut plate basket 108 is configured to be mounted to a structure 110. The nut element 104 is configured to be coupled to the nut plate basket 108 using the releasable retaining clip 106. As such, the nut element 104 is replaceable and removable from the nut plate basket 108, such as when the nut element 104 is damaged or when a different type of nut element 104 is needed.

The nut plate basket 108 is configured to be permanently coupled to the structure 110, such as using fasteners, welding, and the like. In an exemplary embodiment, the nut plate basket 108 is mounted to an interior of the structure 110, which may be a closed structure 110 where access to an interior of the structure 110 defined by an interior surface 112 is limited. For example, in various embodiments, the structure 110 is a structure of an aircraft, such as a flap of an aircraft having an interior that is enclosed. In an exemplary embodiment, the structure 110 includes an opening 114 that provides access to the nut plate basket 108 from an exterior of the structure 110 defined by an exterior surface 116. The nut plate basket 108 is mounted to the structure 110 at the opening 114, such that the nut plate basket 108 and the nut element 104 are accessible from the exterior through the opening 114, such as for mounting removable fasteners or other elements to the nut element 104, such as for GSE attachment. The opening 114 may have any shape, such as a square or rectangular shape or a circular shape aligned with the nut plate basket 108. Optionally, the opening 114 may be closed by a cover, lid, plug or other structure when the nut element 104 is not in use.

The nut plate basket 108 includes a base 120 having mounting flanges 122 for mounting the nut plate basket 108 to the structure 110. In the illustrated embodiment, the mounting flanges 122 are coplanar with the base 120; however, the mounting flanges 122 may extend from the base 120 in other various embodiments to move the base 120 away from the interior surface 112 of the structure 110. In the illustrated embodiment, the mounting flanges 122 have mounting openings 124 for receiving fasteners (not shown) to secure the mounting flanges 122 to the structure 110. Other types of mounting flanges may be provided in alternative embodiments.

The base 120 of the nut plate basket 108 includes an interior surface 126 and an exterior surface 128 opposite the interior surface 126. The interior surface 126 faces the interior of the structure 110. The exterior surface 128 faces the exterior of the structure 110. For example, the exterior surface 128 is exposed in the opening 114 of the structure 110. The exterior surface 128 may be mounted to the interior surface 112 of the structure 110. The base 120 includes an opening 130 therethrough that provides access to the nut element 104 from the exterior of the structure 110. The opening 130 is aligned with the opening 114. In the illustrated embodiment, the opening 130 is circular; however, the opening 130 may have other shapes in alternative embodiments.

The nut plate basket 108 includes side walls 132 extending from opposite sides of the base 120. The side walls 132 extend from the interior surface 126. The side walls 132 include slots 134 configured to receive the retaining clip 106. In the illustrated embodiment, the slots 134 are elongated, rectangular slots; however, the slots 134 may have other shapes in alternative embodiments. The slots 134 are configured to retain the retaining clip 106 to prevent lift-off of the retaining clip 106 and the nut element 104 to retain the nut element 104 in the nut plate basket 108.

The nut element 104 includes a base 140, which, in various embodiments, is generally planar, extending between opposite sides and opposite ends. While the base 140 is rectangular in the illustrated embodiment, the base 140 may have other shapes in alternative embodiments. In the illustrated embodiment, the base 140 includes recesses 144 at the ends. The recesses 144 are generally aligned with the mounting openings 124 for receiving the fasteners. The base 140 includes an interior surface 146 and an exterior surface 148. The exterior surface 148 is configured to be mounted to and abut against the interior surface 126 of the nut plate basket 108.

The nut element 104 includes a nut portion 150 extending from the interior surface 146 of the base 140. The nut portion 150 includes a bore 152 extending therethrough. The bore 152 is configured to be aligned with the opening 130 in the nut plate basket 108. In an exemplary embodiment, the bore 152 includes threads 154 configured to receive a threaded element, such as a removable fastener for GSE attachment or for attaching another component to the structure 110.

The retaining clip 106 is used for securing the nut element 104 to the nut plate basket 108. The retaining clip 106 includes a body 160 having an open end 162 and a closed end 164. The retaining clip 106 includes legs 166 meeting at the closed end 164 extending to tips 168 at the open end 162.

In the illustrated embodiment, the body 160 is generally C-shaped; however, the body 160 may have other shapes in alternative embodiments. In an exemplary embodiment, the legs 166 have side portions 170, 172 that bulge outward. The side portions 170, 172 are configured to be received in the slots 134 in the side walls 132 of the nut plate basket 108 to secure the retaining clip 106 to the nut plate basket 108. In an exemplary embodiment, the retaining clip 106 is compressible to a compressed state by compressing the legs 166 toward each other to change the shape of the body 160, such as to make the body 160 narrower to fit between the side walls 132. When the legs 166 are released, the legs 166 expand outward to an expanded state to locate the side portions 170, 172 in the slots 134. In an exemplary embodiment, the retaining clip 106 is manufactured from a metal material having spring characteristics to allow the body 160 to be elastically compressed and then return to the expanded state.

The nut element installation tool 102 includes a holder 200, an actuator 202 configured to be attached to the holder 200 and a shaft 204 configured to be attached to the holder 200. In an exemplary embodiment, the nut element installation tool 102 includes a temporary fastener 206 configured to be coupled to the holder 200. In an exemplary embodiment, the nut element installation tool 102 includes a locator 208 configured to be coupled to the holder 200.

The holder 200 includes an upper plate 210, a lower plate 212 and a shuttle 214 movable between the upper plate 210 and the lower plate 212 between an extended position and a released position. In the extended position, the shuttle 214 holds the retaining clip 106 and/or the nut element 104. In the released position, the shuttle 214 releases the retaining clip 106 and/or the nut element 104 such that the retaining clip 106 is secured to the nut plate basket 108. For example, the shuttle 214 receives the retaining clip 106 and holds the retaining clip 106 in the compressed state when the shuttle 214 is in the extended position. The holder 200 is maneuvered through the structure 110 and located at the nut plate basket 108 while holding the retaining clip 106. Once positioned, the shuttle 214 can be moved to the released position and the shuttle 214 releases the retaining clip 106 allowing the retaining clip 106 to expand to the expanded state in the nut plate basket 108 to retain the nut element 104 in the nut plate basket 108.

The upper plate 210 has an upper plate bore 220 extending between a first surface 222 and a second surface 224. Optionally, the upper plate 210 may be generally planar. The upper plate 210 includes an opening 226 that receives the actuator 202. For example, the actuator 202 passes through the opening 226 to couple to the shuttle 214.

The lower plate 212 has a lower plate bore 230 (shown in FIG. 2) extending between a first surface 232 and a second surface 234. Optionally, the lower plate 212 may be generally planar. In various embodiments, the lower plate 212 is two separate pieces with a gap or space therebetween defining the lower plate bore 230. Alternatively, the lower plate 212 may be a single piece rather than multiple pieces. In an exemplary embodiment, the lower plate 212 is coupled to the upper plate 210 using pins 236 that fix the upper plate 210 relative to the lower plate 212. A space 238 is defined between the upper plate 210 and the lower plate 212. The shuttle 214 is movable within the space 238 between the extended position and the released position.

The shuttle 214 includes a shuttle bore 240 extending between a first surface 242 and a second surface 244. The shuttle bore 240 is axially aligned with the lower plate bore 230 and the upper plate bore 220. The shuttle bore 240 is threaded and the shaft 204 is configured to be threadably coupled to the shuttle 214 to axially hold the shuttle 214. When the holder 200 is coupled to the nut plate basket 108, the shuttle bore 240 is axially aligned with the opening 130 in the nut plate basket 108. The first surface 242 faces the lower plate 212, such as the second surface 234 of the lower plate 212. The second surface 244 faces the upper plate 210, such as the first surface 222 of the upper plate 210. In an exemplary embodiment, the shuttle 214 includes pin bores that receive the pins 236. The shuttle 214 is slidable along the pins 236.

The shuttle 214 has an opening 246 that receives the actuator 202. Optionally, the opening 246 is generally aligned with the opening 226. In the illustrated embodiment, the actuator 202 is a string that is routed through the upper plate 210 and connected to the shuttle 214. Optionally, the actuator 202 may include a stop 248 larger than the opening 246 to restrict the string from being pulled out of the shuttle 214. The stop 248 engages the shuttle 214 when the actuator 202 is pulled to move the shuttle 214 between the extended position and the released position. The string is routed back to another part of the structure, such as an opening or access port in the structure 110 that is accessible to the installer. The string is pulled, such as from the exterior of the structure 110, to actuate the shuttle 214 relative to the upper plate 210 and the lower plate 212 to move the shuttle 214 between the extended position and the released position. The actuator 202 is used to retrieve the nut element installation tool 102 from the interior of the structure 110. Other types of actuators 202 may be used in alternative embodiments, such as a solid rod, or other type of actuator.

In an exemplary embodiment, the shuttle 214 includes side walls 250 extending from the first surface 242. The side walls 250 define a pocket 252 at the first surface 242. In an exemplary embodiment, the lower plate 212 is received in the pocket 252 between the side walls 250. In an exemplary embodiment, the pocket 252 receives the retaining clip 106 and/or the nut element 104. For example, at least a portion of the pocket 252 is positioned below the lower plate 212, such as below the first surface 232 of the lower plate 212, to receive the retaining clip 106. In an exemplary embodiment, the side walls 250 include slots 254 that receive the retaining clip 106. For example, the side portions 170, 172 of the retaining clip 106 are received in the slots 254. The shuttle 214 is configured to hold the retaining clip 106 in the compressed state between the side walls 250. When the holder 200 is located on the nut plate basket 108, the side walls 250 of the shuttle 214 fit inside the side walls 132 of the nut plate basket 108. The slots 254 of the shuttle 214 are aligned with the slots 134 of the nut plate basket 108. When the shuttle 214 is moved from the extended position to the released position, the side walls 250 are lifted and the retaining clip 106 is released from the pocket 252 such that the retaining clip 106 is free to move to the expanded state. When the legs 166 of the retaining clip 106 are expanded, the side portions 170, 172 are expanded into the slots 134 of the side walls 132 of the nut plate basket 108.

The shaft 204 includes an elongated body 260 extending between a threaded end 262 and a head end 264. The elongated body 260, in various embodiments, is generally cylindrical; however, the body 260 may have other shapes in alternative embodiments. In an exemplary embodiment, the threaded end 262 includes threads 266 along the exterior of the body 260. The threads 266 are configured to be threadably coupled to the shuttle 214 via an internal thread 272 formed on the shuttle bore 240. Optionally, the threads 266 are threadably coupled to the nut element 104. When coupled to the holder 200, the shaft 204 is configured to extend to the exterior of the structure 110. For example, the head end 264 passes through the opening 130 in the nut plate basket 108 and the opening 114 in the structure 110 such that the head end 264 is configured to be accessed from the exterior of the structure 110. In an exemplary embodiment, the shaft 204 includes flats 268 at the head end 264. The flats 268 are configured to be engaged by a tool, such as a wrench or socket tool to rotate the shaft 204, such as for threadably coupling to or uncoupling from the shuttle 214 and/or the nut element 104. The shaft 204 may include other means for rotating the shaft 204 in alternative embodiments.

The shaft 204 includes a shaft bore 270 extending therethrough. The shaft bore 270 is configured to be axially aligned with the shuttle bore 240. In an exemplary embodiment, the shaft bore 270 is configured to receive the locator 208 for manipulating, maneuvering and positioning the nut element installation tool 102 relative to the nut plate basket 108. For example, in the illustrated embodiment, the locator 208 is a string that is routed through the holder 200 and the shaft 204. The string is routed through the opening 130 in the nut plate basket 108 and then pulled from the exterior of the structure 110 to maneuver the nut element installation tool 102 into position on the nut plate basket 108. The locator 208 may be removed after the holder 200 is positioned in the nut plate basket 108. Other types of locators 208 may be used in alternative embodiments, such as a solid rod, or other type of locator.

In an exemplary embodiment, the shaft bore 270 is configured to receive the temporary fastener 206, such as through the head end 264. Once the nut element installation tool 102 is located relative to the nut plate basket 108, the temporary fastener 206 is loaded through the shaft bore 270 to engage the holder 200, such as the upper plate 210 of the holder 200. The temporary fastener 206 fixes the location of the holder 200 on the nut plate basket 108, such as to remove the shaft 204. For example, the temporary fastener 206 is fixed relative to the structure 110 to fix the holder 200 relative to the nut plate basket 108 to allow removal of the shaft 204. The temporary fastener 206 may be any type of fastener, such as a power pin that may be expanded, once properly positioned, to retain the holder 200. The temporary fastener 206 is later removed to allow removal of the holder 200 from the nut plate basket 108, such as after the retaining clip 106 is released and coupled to the nut plate basket 108.

Figure 2:
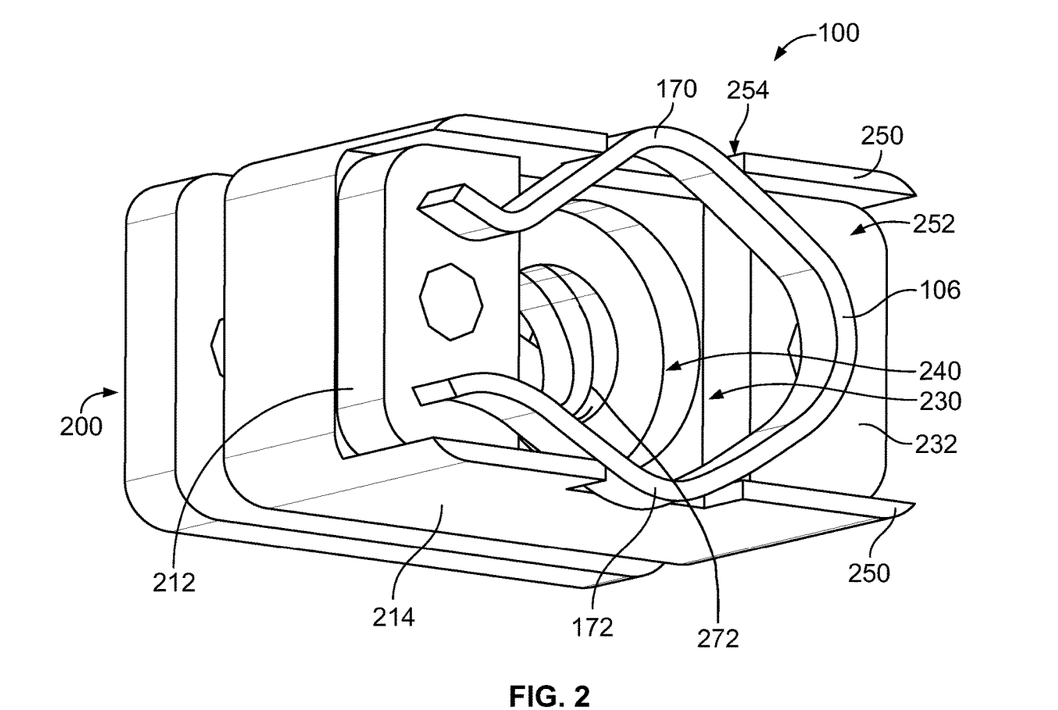
FIG. 2 is a bottom perspective view of a portion of the nut plate assembly showing a holder and a retaining clip in a compressed state in the holder.

FIG. 2 is a bottom perspective view of a portion of the nut plate assembly 100 showing the holder 200 and the retaining clip 106 in the compressed state in the holder 200. The shuttle 214 is shown in the extended position with the retaining clip 106 in the pocket 252. The retaining clip 106 is compressed between the side walls 250 and held in the slots 254. For example, the side portions 170, 172 extend into the slots 254 to position the retaining clip 106 relative to the holder 200. The retaining clip 106 is positioned below the lower plate 212. For example, the retaining clip 106 abuts against the first surface 232 of the lower plate 212. The retaining clip 106 is generally aligned with the lower plate bore 230 and the shuttle bore 240 to receive a portion of the nut element 104 and the shaft 204 (both shown in FIG. 3). The shuttle bore 240 is shown as including the internal thread 272 configured to be threadably coupled to the threads 266 of the shaft 204 (both shown in FIG. 1).

Figure 3:
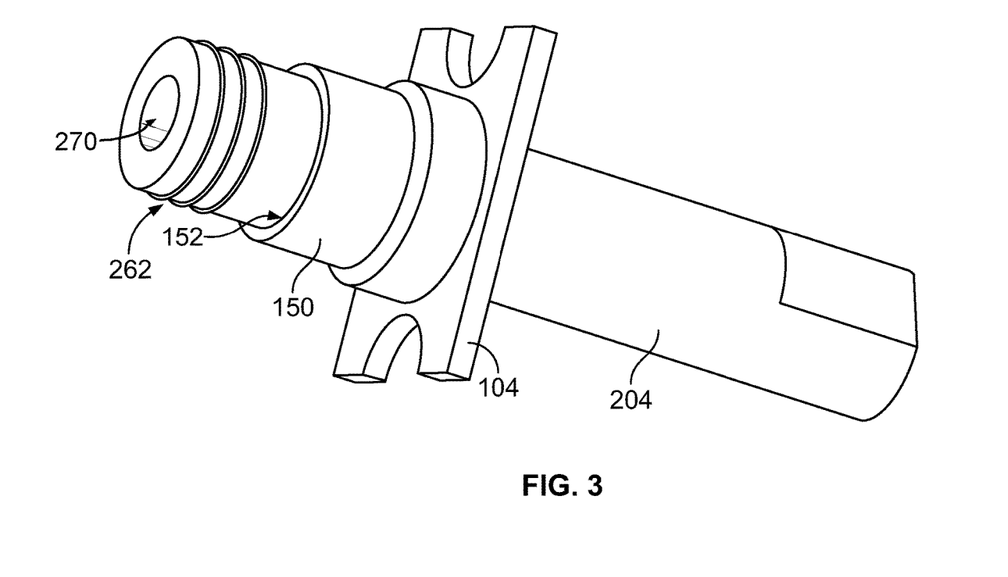
FIG. 3 is a perspective view of a shaft of the nut plate assembly holding a nut element.

FIG. 3 is a perspective view of the shaft 204 holding the nut element 104. In an exemplary embodiment, during assembly, the nut element 104 is loaded onto the shaft 204. For example, the threaded end 262 of the shaft 204 passes through the bore 152 in the nut portion 150 of the nut element 104. The shaft 204 is configured to be coupled to the holder 200 (shown in FIG. 2) to position the nut element 104 below the retaining clip 106 (shown in FIG. 2). For example, the threaded end 262 is threadably coupled to the shuttle 214 (shown in FIG. 2).

Figure 4:
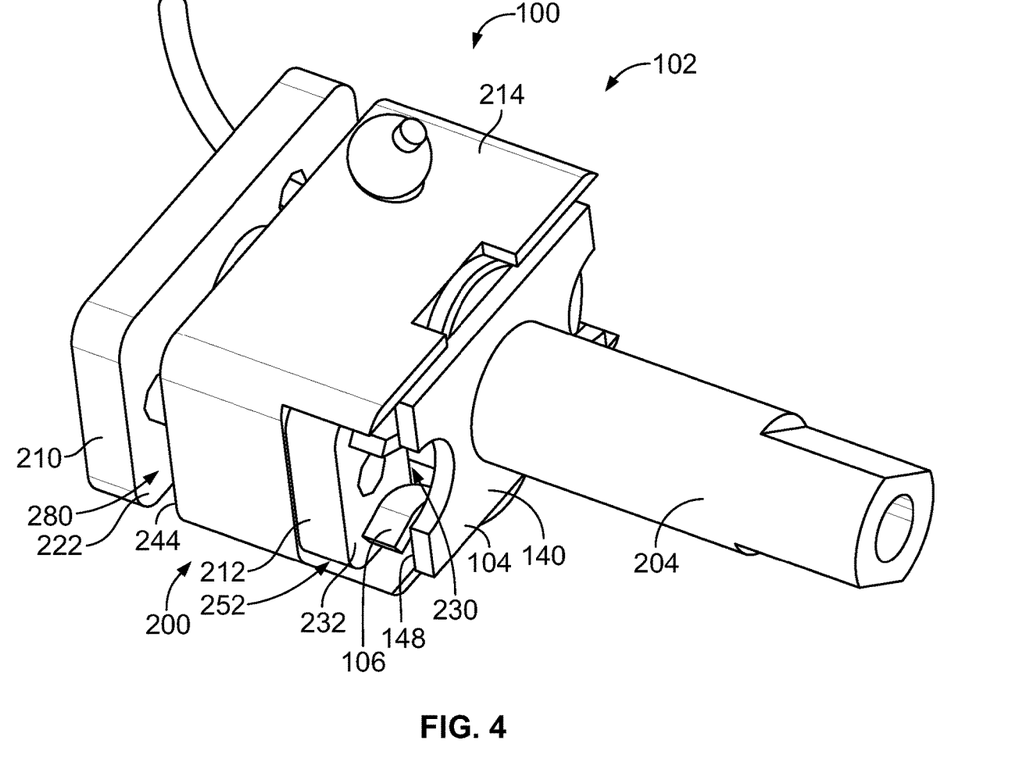
FIG. 4 is a perspective view of a portion of the nut plate assembly showing the shaft and the nut element coupled to the holder.

FIG. 4 is a perspective view of a portion of the nut plate assembly 100 showing the shaft 204 and the nut element 104 coupled to the holder 200. The nut element installation tool 102 is assembled by threadably coupling the shaft 204 to the shuttle 214. For example, the threaded end 262 (shown in FIG. 3) is loaded through the lower plate bore 230 into the shuttle bore 240 (shown in FIG. 2). The threaded end 262 is threadably coupled to the shuttle 214 in the shuttle bore 240. The nut portion 150 (shown in FIG. 3) of the nut element 104 is received in the pocket 252 and extends through the lower plate bore 230 into the shuttle bore 240. The nut portion 150 passes through the retaining clip 106. The base 140 of the nut element 104 is positioned below the retaining clip 106. The retaining clip 106 is captured between the first surface 232 of the lower plate 212 and the exterior surface 148 of the base 140 of the nut element 104. The shaft 204 is pulled outward to hold the shuttle 214 in the extended position to retain the retaining clip 106 in the pocket 252.

A gap 280 is provided between the second surface 244 of the shuttle 214 and the first surface 222 of the upper plate 210. The gap 280 provides a space for the shuttle 214 to move to release the retaining clip 106 from the shuttle 214 during connection to the nut plate basket 108 (shown in FIG. 5).

Figure 5:
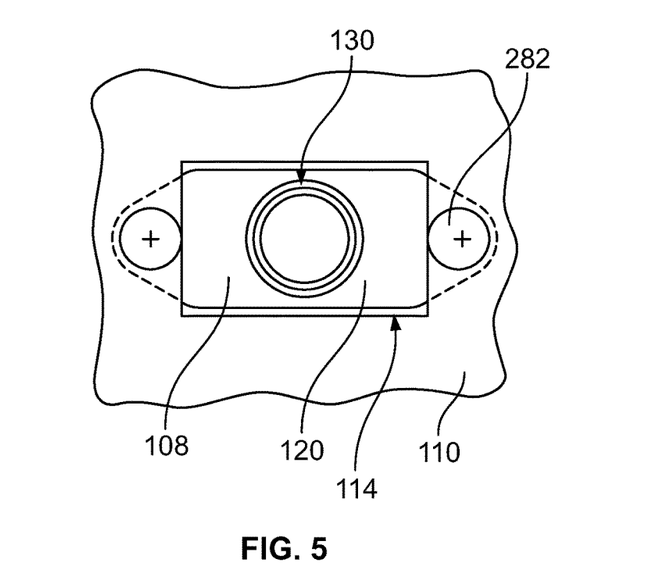
FIG. 5 is a bottom view from an exterior of a structure illustrating a nut plate basket of the nut plate assembly coupled to the structure.

FIG. 5 is a bottom view from the exterior of the structure 110 illustrating the nut plate basket 108 coupled to the structure 110 at the opening 114. The nut plate basket 108 is coupled to the interior of the closed structure 110, such as using fasteners 282. The base 120 extends along the opening 114 of the structure 110. The opening 130 in the base 120 is aligned with the opening 114 of the structure 110, such as to receive a removable fastener or other component.

Figures 6, 7:
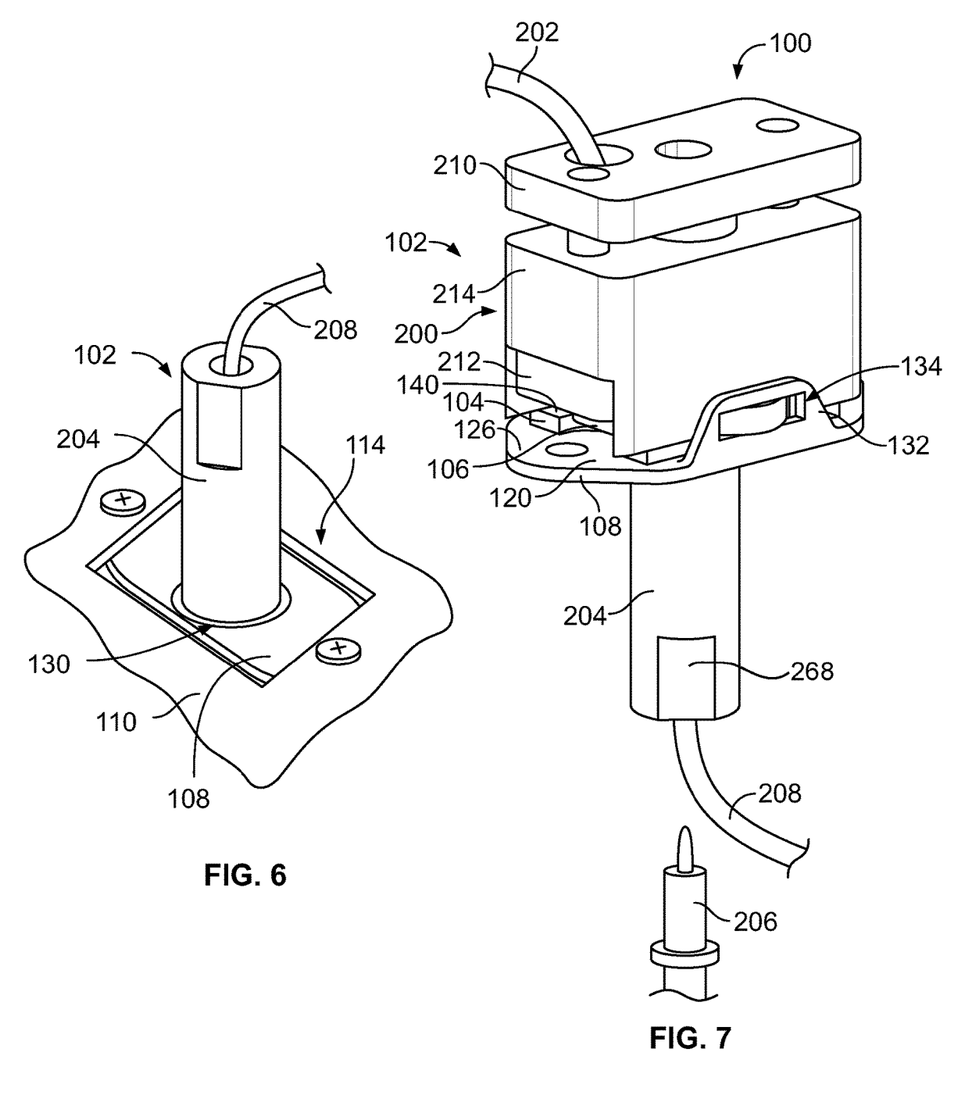
FIG. 6 is a bottom perspective view from an exterior of the structure illustrating a nut element installation tool positioned relative to the nut plate basket.
FIG. 7 is a perspective view of a portion of the nut plate assembly showing the nut element installation tool coupled to the nut plate basket.

FIG. 6 is a bottom perspective view from an exterior of the structure 110 illustrating the nut element installation tool 102 positioned relative to the nut plate basket 108. The nut element installation tool 102 is maneuvered into position relative to the nut plate basket 108 from inside the structure 110 such that the shaft 204 extends through the opening 130 to the exterior of the structure 110. In an exemplary embodiment, the locator 208 is used to help locate and maneuver the nut element installation tool 102 through the inside of the structure 110 to the nut plate basket 108 because access to the interior of the nut plate basket 108 is limited by the closed structure 110. For example, in the illustrated embodiment, the locator 208 is a string, which is fed or routed through the opening 130 in the nut plate basket 108 and pulled to bring the shaft 204 through the opening 130 and the opening 114. The shaft 204 is pulled outward to seat the nut element 104 and the retaining clip 106 (both shown in FIG. 7) in the nut plate basket 108.

FIG. 7 is a perspective view of a portion of the nut plate assembly 100 showing the nut element installation tool 102 coupled to the nut plate basket 108 to locate the nut element 104 and the retaining clip 106 in the nut plate basket 108. The structure 110 (shown in FIG. 6) is removed for clarity to illustrate the nut plate basket 108 and the nut element installation tool 102. The nut element 104 and the retaining clip 106 are positioned above the interior surface 126 of the base 120 of the nut plate basket 108. For example, the base 140 of the nut element 104 is pulled against the interior surface 126 of the base 120 of the nut plate basket 108. The nut element installation tool 102 aligns the retaining clip 106 with the slots 134 in the side walls 132 of the nut plate basket 108. The shaft 204 is pulled downward to hold the shuttle 214 against the lower plate 212. For example, the shaft 204 may be pulled by the operator from the exterior of the structure 110. The lower plate 212 presses the retaining clip 106 and the nut element 104 against the nut plate basket 108. Once positioned, the locator 208 may be removed.

In an exemplary embodiment, once the nut element installation tool 102 is positioned at the nut plate basket 108, the temporary fastener 206 is used to temporarily secure the holder 200 in position relative to the nut plate basket 108. For example, the temporary fastener 206 is a power pin configured to be temporarily coupled to the holder 200 to retain the holder 200 in position above the nut element 104 and the retaining clip 106. In an exemplary embodiment, the temporary fastener 206 is loaded through the shaft bore 270 (shown in FIG. 3) to engage the upper plate 210. The temporary fastener 206 is configured to be coupled to the upper plate 210. The temporary fastener 206 secures the location of the upper plate 210, and thus the lower plate 212, relative to the nut plate basket 108.

Once the temporary fastener 206 is secured in position, the shaft 204 is uncoupled from the shuttle 214. For example, the shaft 204 is rotated to un-thread from the shuttle 214. The user may use a tool, such as a wrench on the flats 268, to un-thread the shaft 204 from the shuttle 214. Once the shaft 204 is uncoupled from the shuttle 214, the shuttle 214 is movable relative to the lower plate 212 to move to the released position. For example, the actuator 202 is used to actuate or move the shuttle 214. In alternative embodiments, rather than removing the shaft 204, the shaft 204 may be used to actuate the shuttle 214 and lift the shuttle 214 upward relative to the lower plate 212 to the released position by manipulating the shaft 204 from the exterior of the structure 110.

Figure 8:
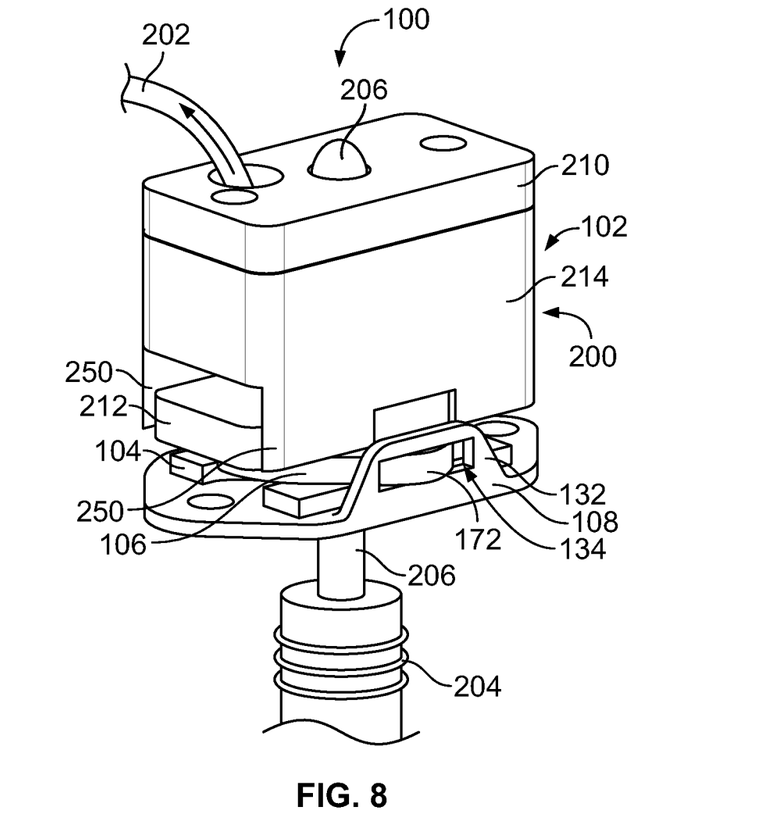
FIG. 8 is a perspective view of a portion of the nut plate assembly showing the nut element installation tool coupled to the nut plate basket.

FIG. 8 is a perspective view of a portion of the nut plate assembly 100 showing the nut element installation tool 102 coupled to the nut plate basket 108. The shuttle 214 is shown in the released position. The retaining clip 106 is shown in the expanded state engaging the nut plate basket 108 to retain the nut element 104 in the nut plate basket 108. Once the shaft 204 is uncoupled from the shuttle 214, the shuttle 214 is able to move from the extended position (FIG. 7) to the released position (FIG. 8). The temporary fastener 206 maintains the position of the upper plate 210 and the lower plate 212 relative to the nut plate basket 108, which allows the shuttle 214 to be pulled toward the upper plate 210 by the actuator 202. As the shuttle 214 is pulled upward, the side walls 250 are moved upward. Once the side walls 250 are moved above the retaining clip 106, the retaining clip 106 is released and allowed to expand outward. The side portions 170, 172 expand into the slots 134 and the side walls 132 of the nut plate basket 108. The retaining clip 106 is thus used to hold the nut element 104 in the nut plate basket 108.

After the retaining clip 106 is coupled to the nut plate basket 108, the nut element installation tool 102 is removed from the nut plate basket 108. In an exemplary embodiment, the temporary fastener 206 is released or unfastened from the holder 200. For example, the temporary fastener 206 and the shaft 204 are removed from the exterior of the structure 110. The holder 200, which is connected to the actuator 202, is removed from the interior of the structure 110, such as by pulling the actuator 202 to drag the holder 200 to a location that is accessible by the installer. The holder 200 is then removed from the inside of the structure 110, such as through an access port or other area of the structure 110 remote from the opening 114.

Figure 9:
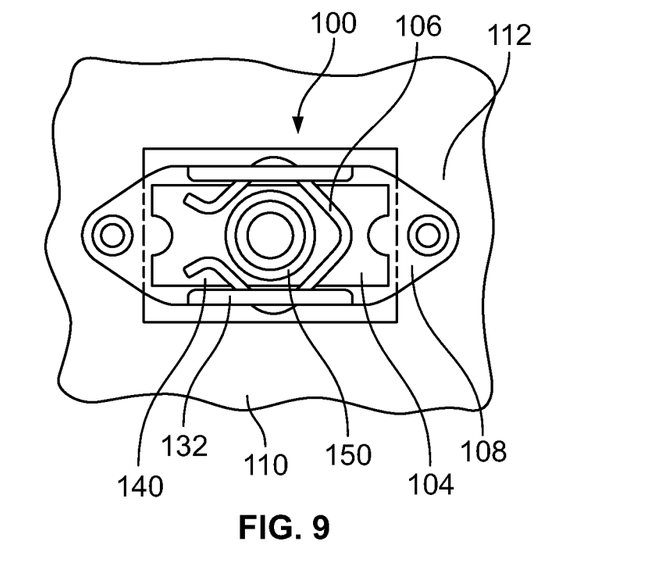
FIG. 9 illustrates the nut plate assembly showing the retaining clip holding the nut element in the nut plate basket.

FIG. 9 illustrates the nut plate assembly 100 illustrating the retaining clip 106 holding the nut element 104 in the nut plate basket 108. The nut plate basket 108 is mounted to the interior surface 112 of the structure 110. The retaining clip 106 is in the expanded state and coupled to the side walls 132 of the nut plate basket 108. The retaining clip 106 holds the base 140 of the nut element 104 in the nut plate basket 108. The nut portion 150 of the nut element 104 is configured to receive a component, such as a removable fastener or other type of component.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the disclosure without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A nut element installation tool for installing a nut element in a nut plate basket using a retaining clip in an interior of a closed structure, the nut element installation tool comprising:
   a holder for the nut element and the retaining clip, the holder including an upper plate, a lower plate, a pin extending between the upper plate and the lower plate, and a shuttle movable between the upper plate and the lower plate between an extended position and a released position;
   the upper plate having an upper plate bore extending between a first surface and a second surface of the upper plate;
   the lower plate having a lower plate bore extending between a first surface and a second surface of the lower plate;
   the pin coupled to the upper plate and coupled to the lower plate to fix the upper plate relative to the lower plate, the shuttle being slidably coupled to the pin and being movable along the pin between the lower plate and the upper plate as the shuttle moves between the extended position and the released position;
   the shuttle having a shuttle bore extending between a first surface and a second surface of the shuttle, the shuttle having a pocket at the first surface configured to receive the nut element and the retaining clip, wherein the shuttle includes side walls at the pocket configured to hold the retaining clip in a compressed state in the pocket when the shuttle is in the extended position until the shuttle is moved to the released position, wherein the side walls are configured to release from the retaining clip when the shuttle is moved to the released position to allow the retaining clip to move to an expanded state in the nut plate basket to retain the nut element in the nut plate basket; and a shaft coupled to the holder, the shaft passing through the lower plate bore into the shuttle bore to releasably couple to the shuttle, the shaft being configured to hold the shuttle in the extended position.

2. The nut element installation tool of claim 1, wherein the side walls define the pocket, the lower plate being received in the pocket between the side walls, the side walls containing the lower plate in the pocket in at least two mutually perpendicular directions.

3. The nut element installation tool of claim 1, wherein the side walls include slots configured to receive side portions of the retaining clip, the shuttle being received in the nut plate basket such that the slots are aligned with slots in the nut plate basket when the shuttle is in the extended position, the side walls being moved away from the nut plate basket when the shuttle is moved to the released position to allow the retaining clip to expand into the slots in the nut plate basket.

4. The nut element installation tool of claim 1, wherein the first surface of the lower plate is configured to hold the retaining clip and the nut element in the nut plate basket as the shuttle is moved from the extended position to the released position.

5. The nut element installation tool of claim 1, further comprising an actuator coupled to the shuttle to move the shuttle from the extended position to the released position.

6. The nut element installation tool of claim 1, wherein the upper plate includes an opening, the nut element installation tool further comprising an actuator received in the opening and being coupled to the shuttle, the actuator and the shuttle moving relative to the upper plate between the extended position and the released position.

7. The nut element installation tool of claim 1, wherein the pin is a first pin, the holder further comprises a second pin coupled between the upper plate and the lower plate to fix the upper plate to the lower plate, the shuttle being movable along the first and second pins between the extended position and the released position.

8. The nut element installation tool of claim 1, wherein the shaft includes a shaft bore axially aligned with the upper plate bore, the lower plate bore and the shuttle bore, the shaft bore receiving a temporary fastener, the temporary fastener being coupled to the upper plate to secure the upper plate in position relative to the nut plate basket as the shaft is released from the shuttle.

9. The nut element installation tool of claim 1, wherein the shaft is threadably coupled to the shuttle, the shaft being rotated to release from the shuttle after the nut element is positioned in the nut plate basket.

10. The nut element installation tool of claim 1, wherein the shaft includes a threaded end and a head end, the threaded end being releasably coupled to the shuttle, the head end being accessible from an exterior of the closed structure to rotate and release the shaft from the shuttle.

11. A nut plate assembly comprising:
a nut element and a retaining clip configured to be releasably coupled to a nut plate basket mounted to a closed structure at a mounting location, the nut element and the retaining clip being coupled to an interior of the nut plate basket facing an interior of the closed structure; and a nut element installation tool for installing the nut element and the retaining clip on the nut plate basket, the nut element installation tool including a holder and a shaft releasably coupled to the holder, the holder holding the nut element and the retaining clip and being positionable inside the interior of the closed structure to interface with the interior of the nut plate basket, the shaft configured to extend from the holder to an exterior of the closed structure for removal of the shaft from the holder, the holder having an upper plate, a lower plate fixed relative to the upper plate and a shuttle movably coupled between the upper plate and the lower plate, the shuttle movable between an extended position and a released position, the shaft holding the shuttle in the extended position and the shuttle being movable to the released position after the shaft is released from the holder, the shuttle having a pocket configured to hold the nut element and the retaining clip in the extended position, the nut element and the retaining clip being released into the nut plate basket in the released position.

12. The nut plate assembly of claim 11, wherein the upper plate includes an upper plate bore extending between a first surface and a second surface of the upper plate, the lower plate includes a lower plate bore extending between a first surface and a second surface of the lower plate, and the shuttle includes a shuttle bore extending between a first surface and a second surface of the shuttle, the pocket being provided at the first surface of the shuttle, the upper plate bore, the lower plate bore and the shuttle bore being axially aligned.

13. The nut plate assembly of claim 11, wherein the nut plate basket includes a base having an interior surface and side walls extending from the interior surface of the base, the side walls having slots receiving the retaining clip when the retaining clip is released from the pocket to secure the nut element in the nut plate basket.

14. The nut plate assembly of claim 11, wherein the nut plate basket includes a base having an interior surface and an exterior surface facing the closed structure, the nut plate basket having an opening through the base, the holder positioning the nut element and the retaining clip at the interior surface of the base of the nut plate basket and the lower plate holding the nut element against the interior surface of the base of the nut plate basket, the shaft extending from the holder through the opening in the base of the nut plate basket to an exterior of the closed structure.

15. The nut plate assembly of claim 11, wherein the shaft is removable from the nut plate basket from the exterior of the closed structure and wherein the holder is removable from the nut plate basket from the interior of the closed structure.

16. The nut plate assembly of claim 11, wherein the side walls defining the pocket, the lower plate being received in the pocket between the side walls, the side walls including slots configured to receive side portions of the retaining clip to position the retaining clip in the pocket, the side walls being moved away from the nut plate basket when the shuttle is moved to the released position to allow the retaining clip to expand into the slots in the side walls.

17. The nut plate assembly of claim 11, wherein the lower plate holds the retaining clip and the nut element in the nut plate basket as the shuttle is moved from the extended position to the released position.

18. The nut plate assembly of claim 11, further comprising an actuator coupled to the shuttle to move the shuttle from the extended position to the released position.

19. The nut plate assembly of claim 11, wherein the shaft includes a shaft bore axially aligned with the upper plate, the lower plate and the shuttle, the shaft bore receiving a temporary fastener being coupled to the upper plate to secure the upper plate in position relative to the nut plate basket when the shaft is released from the holder.

20. A method of installing a nut element in a nut plate basket using a retaining clip in an interior of a closed structure, the method comprising:
 loading the retaining clip and the nut element in a holder including an upper plate, a lower plate, a pin extending between the upper plate and the lower plate, and a shuttle movable on the pin between the upper plate and the lower plate between an extended position and a released position, wherein the retaining clip is held in a compressed state in a pocket of the shuttle below the lower plate and the nut element is held in the pocket of the shuttle with the retaining clip, the shuttle including side walls at the pocket holding the retaining clip in the compressed state in the pocket when the shuttle is in the extended position until the shuttle is moved to the released position;
 coupling a shaft to the shuttle of the holder;
 releasing the shaft from the shuttle; and
 moving the shuttle relative to the lower plate from the extended position to the released position to release the nut element and the retaining clip from the pocket to allow the retaining clip to expand from the compressed state to an expanded state in the nut plate basket to retain the nut element in the nut plate basket, the side walls being released from the retaining clip when the shuttle is moved to the released position to allow the retaining clip to move to the expanded state in the nut plate basket.

\* \* \* \* \*